July 5, 1932.   A. GRABOWSKI   1,866,029
COW TAIL HOLDER
Filed Aug. 11, 1931
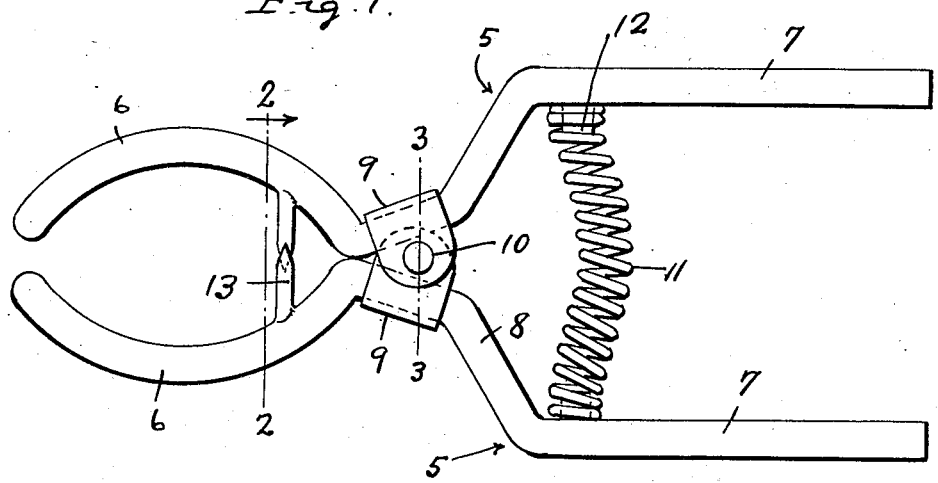
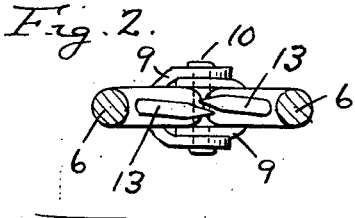
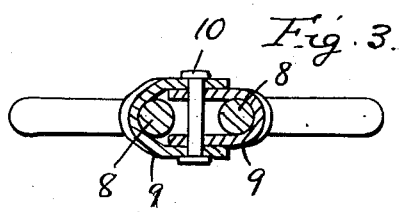
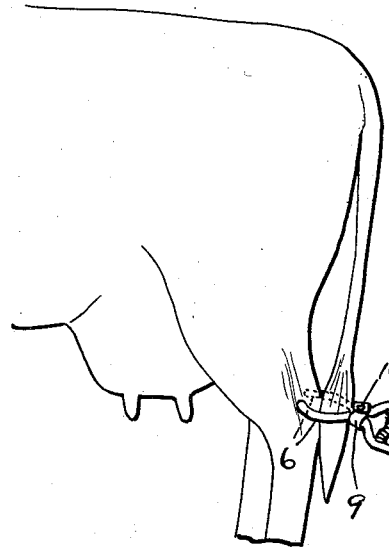
Inventor
Antoni Grabowski
By *Clarence A O'Brien*
Attorney Patented July 5, 1932

1,866,029

UNITED STATES PATENT OFFICE

ANTONI GRABOWSKI, OF PROSSER, WASHINGTON

COW TAIL HOLDER

Application filed August 11, 1931. Serial No. 556,450.

This invention relates to an improved tail holder for cattle, and has as its primary object the provision of a comparatively simple device consisting of few parts easily operated, and thoroughly reliable and practical for holding the tail of a cow against swishing during milking of the cow.

Other objects and advantages of the invention, and the invention itself will be best understood from the following description, taken in connection with the accompanying drawing wherein I have shown a preferred embodiment of the invention, and further, in which Figure 1 is a top plan view of the device.

Figures 2 and 3 are transverse sectional views taken substantially on the lines 2—2 and 3—3 of Figure 1, and Figure 4 is a view of the device in perspective as applied to an animal.

In carrying out my invention, I provide a pair of complemental levers designated generally by the reference characters 5—5 and each include a longitudinally curved or bowed jaw 6 at one end thereof, and a relatively straight handle 7 at the opposite end thereof, the jaw and handle being connected together by an angular intermediate portion 8.

Embracing each intermediate portion 8 adjacent the inner end of a jaw 6 is a substantially U-shaped sleeve 9, and as shown in Figure 3, the open end of one sleeve is arranged within the corresponding end of the other sleeve and a fitted bolt 10 extends through overlapping corresponding portions of the sleeve whereby to provide a pivotal connection between the levers.

The jaws 6 of the device are in confronting relation, and when in a fully closed position, the handles 7 of the device are disposed in substantial parallelism.

The handles 7 are normally urged apart, and the jaws 6 are normally urged toward one another through the medium of a coil spring 11 arranged between the handles adjacent the angular portions 8, and connected with the handles by suitable means 12.

When the jaws are in closed condition, the inner ends of the jaws contract one another with corresponding portions of the angular intermediate portion of the lever in divergent relation to receive therebetween the pivot pin 10.

In actual practice, the jaws are adapted to receive therebetween the hind leg of the cow and are placed over the gambrel portion of the leg. Adjacent their inner ends the jaws receive therebetween a portion of the tail of the cow, and each jaw adjacent the inner end thereof is provided with a nail, tooth or spikes 13 extending inwardly, and adapted when the jaws are in fully closed position to have their pointed free ends arranged one above the other as shown in Figure 2.

The spikes 13 receive therebetween the tail of the cow, and engage therewith, whereby the tail is held firmly and prevented against swishing.

A removal of the device can be readily effected by pressing the handles 7 inwardly toward one another against the action of the spring 11 for the purpose of spreading apart the jaws 6 and moving the spikes 13 away from one another.

Even though I have herein shown and described the preferred embodiment of the invention, it is to be understood that the same is susceptible of further changes, modifications and improvements coming within the scope of the appended claim.

Having thus described my invention, what I claim as new is:

A device of the character described comprising a pair of opposed levers, each of which is provided on one end with a clamping jaw and at a relatively opposite end with a handle, and having an angular intermediate portion connecting said jaw and handle ends, a pair of pivotally connected substantially U-shaped members embracing the angular intermediate portions of the levers, a coil spring connecting the handle portions of the levers, a lateral spike projecting from adjacent one end of each of said jaws, and said spikes being inclined slightly at an angle to the horizontal whereby provision is made for the overlapping of the pointed ends of the spikes in slightly spaced relation when the jaws are in clamping relation.

In testimony whereof I affix my signature.

ANTONI GRABOWSKI.